United States Patent
Saxena et al.

(12) 
(10) Patent No.: US 6,219,684 B1
(45) Date of Patent: Apr. 17, 2001

(54) OPTIMIZED ROUNDING IN UNDERFLOW HANDLERS

(75) Inventors: Rahul Saxena, Sunnyvale; John William Phillips, Menlo Park, both of CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/164,075

(22) Filed: Sep. 30, 1998

(51) Int. Cl.$^7$ ........................................ G06F 7/38
(52) U.S. Cl. .................. 708/496; 708/497; 708/498; 708/551; 712/222
(58) Field of Search .................... 712/222, 221; 708/496, 204, 205, 550

(56) References Cited

U.S. PATENT DOCUMENTS

| | | | |
|---|---|---|---|
| 4,839,846 | * 6/1989 | Hirose et al. | 708/497 |
| 5,258,943 | * 11/1993 | Gamez et al. | 708/497 |
| 5,892,697 | * 4/1999 | Brakefield | 708/496 |
| 5,903,479 | * 5/1999 | Schwarz et al. | 708/205 |
| 5,943,249 | * 8/1999 | Handlogten | 708/496 |
| 6,029,243 | * 2/2000 | Pontius et al. | 712/222 |

* cited by examiner

*Primary Examiner*—Eddie Chan
*Assistant Examiner*—Mackly Monestime
(74) *Attorney, Agent, or Firm*—Blakely, Sokoloff, Taylor & Zafman LLP (57) ABSTRACT

The present invention is a method and apparatus for rounding a result operand of a floating-point (FP) operation which causes an underflow. The FP operation is recomputed using a truncate rounding mode to generate an underflowed operand. The underflowed operand is denormalized and providing characteristic bits. A rounding bit is generated based on the characteristic bits. The rounding bit is merged with the denormalized operand to generate the rounded result operand.

25 Claims, 6 Drawing Sheets

OPTIMIZED ROUNDING IN UNDERFLOW HANDLERS

BACKGROUND

1. Field of the Invention

This invention relates to computer systems. In particular, the invention relates to rounding in floating-point processors.

2. Description of Related Art

Many modern microprocessors operate on single precision floating point data types. One of the numeric exceptions that can occur during floating-point computations is the underflow exception (UE). The UE can be masked by setting certain control bits in a control register. If the UE is masked, then usually the processor will generate the proper underflowed result.

The masked response consists of producing a denormalized result (if possible, or else a zero is generated) that is rounded according to the rounding mode bits in the control register. Denormalizing a floating-point number (referred to as gradual underflow) consists of gradually shifting the significand to the right and inserting leading zero's with each shift, while decrementing the exponent until the minimum exponent (EMIN), that can be represented in single precision format, is reached. If all non-zero significant bits are shifted out before the EMIN is reached then a zero result is generated. Finally, the denormalized result has to be rounded according to the rounding control bits.

Implementing such a denormalizing process and rounding requires significant amount and hardware. Therefore, it is more desirable to implement this task in the microcode exception handler. Still, the denormalization and rounding emulation in microcode is complicated and consumes a large amount of microcode read only memory (ROM) space and execution time.

Therefore there is a need in the technology to provide a simple and efficient method to perform the rounding process for floating-point numeric data to reduce ROM space and execution time.

SUMMARY

The present invention is a method and apparatus for rounding a result operand of a floating-point (FP) operation which causes an underflow. The FP operation is recomputed using a truncate rounding mode to generate an underflowed operand. The underflowed operand is denormalized and providing characteristic bits. A rounding bit is generated based on the characteristic bits. The rounding bit is merged with the denormalized operand to generate the rounded result operand.

BRIEF DESCRIPTION OF THE DRAWINGS

The features and advantages of the present invention will become apparent from the following detailed description of the present invention in which.

DESCRIPTION

The present invention is a method and apparatus for optimizing rounding floating-point result in underflow handlers. The technique forces the truncate rounding control in recomputing the operands to eliminate a term in the rounding bit generation. The rounding-to-nearest equation is simplified resulting in less steps and faster execution time.

In the following description, for purposes of explanation, numerous details are set forth in order to provide a thorough understanding of the present invention. However, it will be apparent to one skilled in the art that these specific details are not required in order to practice the present invention. In other instances, well known electrical structures and circuits are shown in block diagram form in order not to obscure the present invention.

Figure 1:
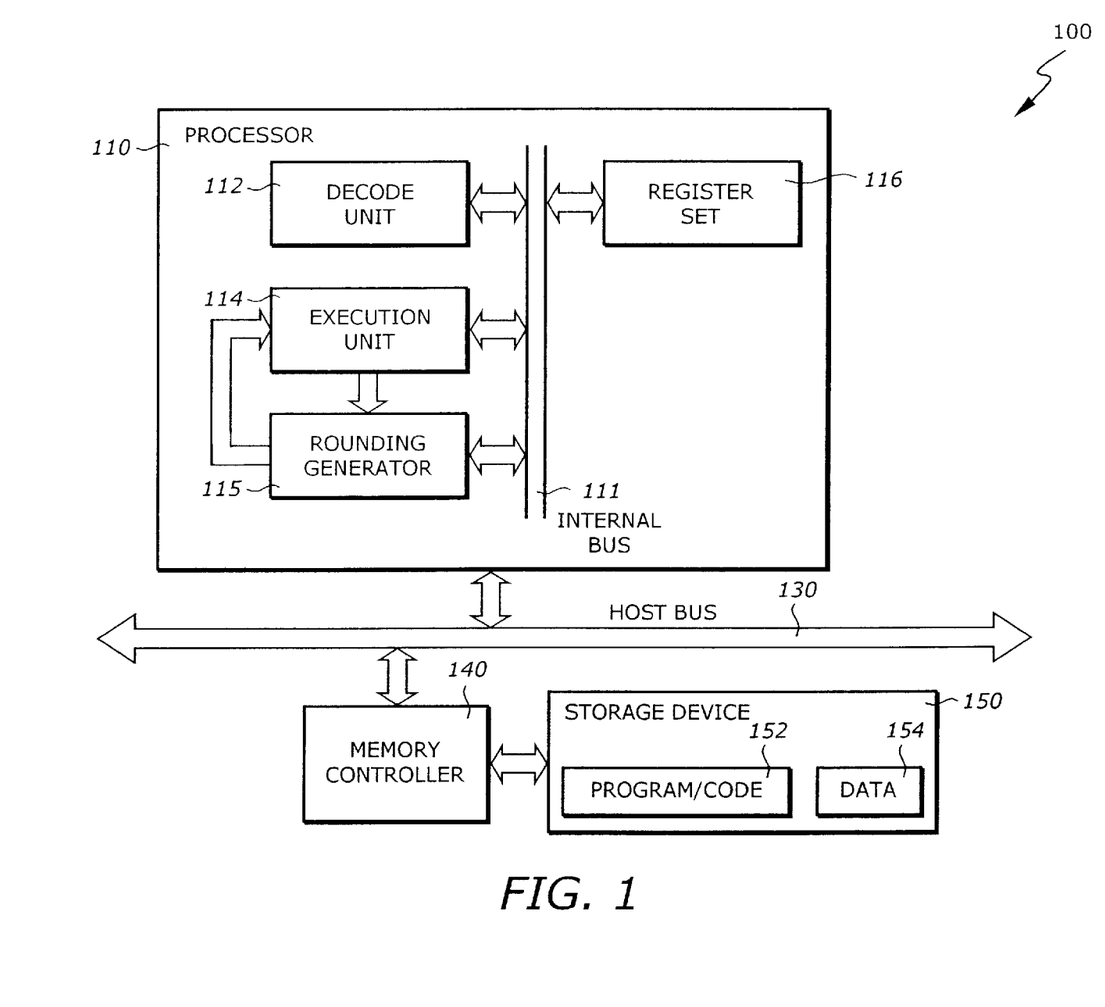
FIG. 1 is a diagram illustrating a computer system in which one embodiment of the invention can be practiced.

FIG. 1 is a diagram illustrating one embodiment of a computer system 100 in which one embodiment of the present invention may be utilized. The computer system 100 comprises a processor 110, a host bus 130, a memory controller 140, and a storage device 150.

The processor 110 represents a central processing unit of any type of architecture, such as complex instruction set computers (CISC), reduced instruction set computers (RISC), very long instruction word (VLIW), or hybrid architecture. While this embodiment is described in relation to a single processor computer system, the invention could be implemented in a multi-processor computer system.

The memory controller 140 provides various access functions to the storage device 150. The memory controller 140 is coupled to the host bus 130 to allow the processor to access the storage device 150. The storage device 150 represents one or more mechanisms for storing information. For example, the storage device 150 may include non-volatile or volatile memories. Examples of these memories include flash memory, read only memory (ROM), or random access memory (RAM).

FIG. 1 also illustrates that the storage device 150 has stored therein program code 152 and data 154. The program code 152 represents the necessary code for performing any and/or all of the techniques in the present invention. The data 154 stores data used by the program code 152, graphics data and temporary data. Of course, the storage device 150 preferably contains additional software (not shown), which is not necessary to understanding the invention.

FIG. 1 additionally illustrates that the processor 110 includes a decode unit 112, an execution unit 114, a rounding generator 115, a register set 116, and an internal bus 111. Of course, the processor 110 contains additional circuitry, which is not necessary to understanding the invention. The decode unit 112 is used for decoding instructions received by processor 110 into control signals and/or microcode entry points. In response to these control signals and/or microcode entry points, the execution unit 114 performs the appropriate operations. The rounding generator 115 is a module that generates the rounding operation for the floating-point result as computed by the execution unit 114. The rounding generator 115 may be implemented in microcode or by hardware. In one embodiment, the rounding generator 115 is a microroutine as part of an underflow handler that responds to the underflow result of the floating-point computations. In register set 116 includes a set of registers for storing intermediate data. In one embodiment, the register set include a number of floating-point registers that store data elements in floating-point format.

Figure 2:
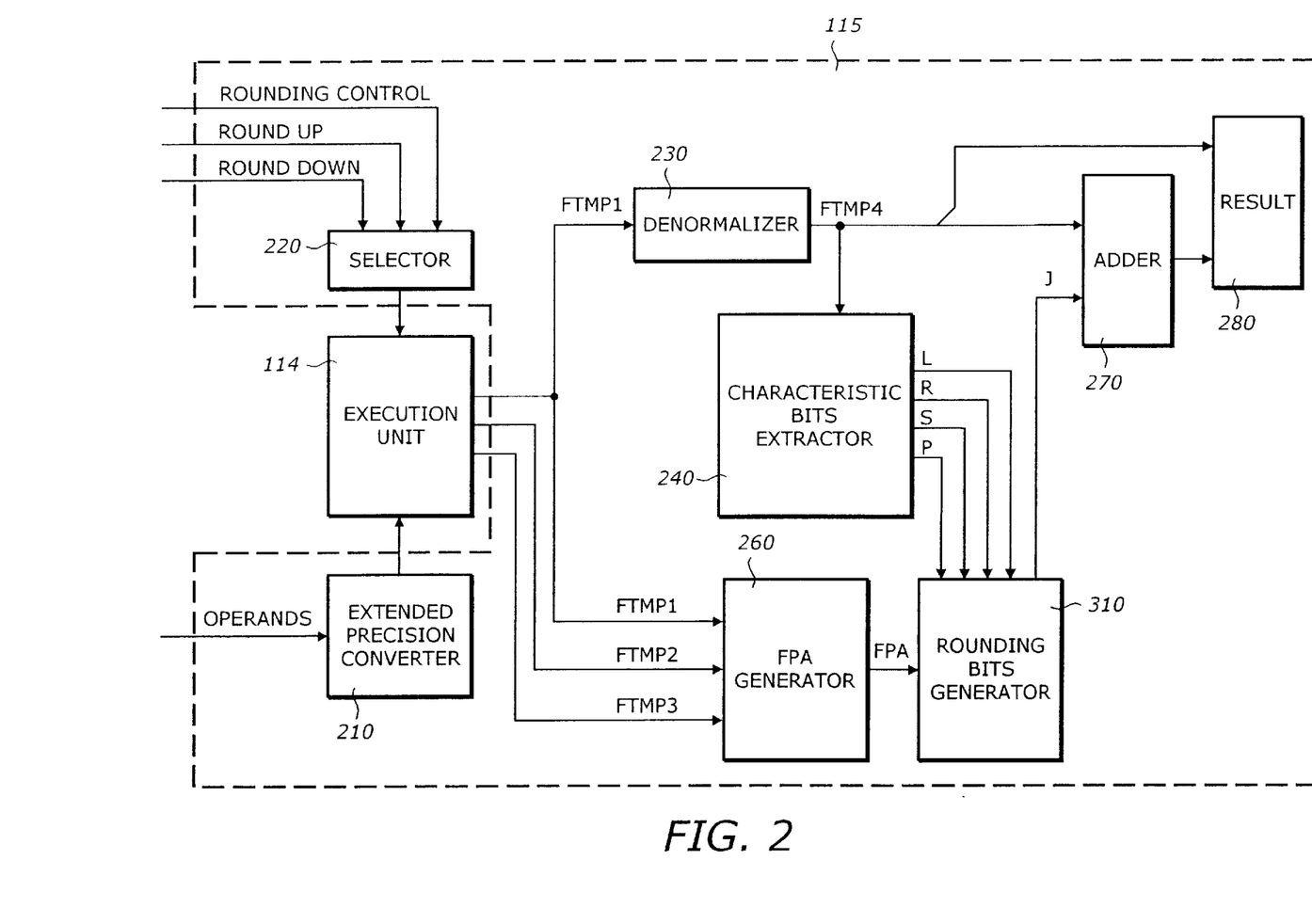
FIG. 2 is a diagram illustrating a standard rounding generator according to one embodiment of the invention.

FIG. 2 is a diagram illustrating a standard rounding generator according to one embodiment of the invention. The rounding generator 115 may be implemented by hardware, software, or by microcode. The rounding generator 115 includes a precision converter 210, a selector 220, a denormalizer 230, a characteristic bits extractor 240, a floating-point accuracy (FPA) generator 250, a rounding bit generator 260, an adder 270, and a result register 280. The rounding generator 115 is coupled to the execution unit 114 in the rounding process. In one embodiment, the rounding generator 115 is implemented as a program or a microroutine in an underflow microcode handler responding to an underflow exception. When implemented in software or microcode, the elements of the rounding generator 115 as shown in FIG. 2 are essentially the code segments or steps in the rounding process. These code segments or steps may be performed in sequential, fully parallel, partially parallel, fully pipelined, partially pipelined, or mixed sequential, parallel, and pipelined mode depending on the microarchitecture of the processor. The program or microcode can be stored in a processor readable medium. The processor readable medium may include any medium that can store or transfer information. Examples of the processor readable medium includes an electronic circuit, a semiconductor memory device, a read-only memory (ROM), a flash memory, an erasable ROM (EROM), a floppy diskette, a compact disk (CD) ROM, an optical disk, a hard disk, a transmission medium, a fiber optic medium, a radio frequency (RF) link, etc.

The precision converter 210 converts the operands from single precision floating point format to double extended register format because denormalization requires additional bits. In one embodiment, the double extended format has 17-bit exponent and 53-bit significand or mantissa. The selector 220 selects the rounding mode to control the rounding operation of the corresponding floating-point unit, or the execution unit 114. Three rounding modes are used: the rounding mode as specified in the rounding control register (e.g., the MXCSR as in the Intel x86 processor), the round-up mode, and the round-down mode. The operation is recomputed three times, each with different rounding mode as selected by the selector 220. The execution unit 114 recomputes the operation using the three rounding modes and generates three temporary floating-point temporary operands: FTMP1, FTMP2, and FTMP3 corresponding to the rounding control register bits, the round-up mode, and the round-down mode, respectively.

The denormalizer 230 denormalizes the FTMP1 operand to generate a temporary floating-point operand FTMP4. The denormalization is performed using the gradual underflow technique. In this technique, the significand is gradually shifted to the right and leading zero's are inserted at each shift. At the same time, the exponent is decremented at each shift.

The characteristic bits extractor 240 extracts the characteristic bits to be used in generating the rounding bit J. The characteristic bits include a least significant (L) bit of the rounded significand part of the denormalized operand, a right (R) next bit, a sticky (S) bit, and a precision flag (P) bit. The R bit is the bit located to the immediate right of the L bit. The S bit is generated as the result of the Oring of all the bits to the right of the R bit, including the truncated bits. The truncated bits are those bits that are truncated before the denormalization if the exact result cannot be represented in the double extended precision format. In other words, if any of the bits to the right of the R bit, including the truncated bits, is a 1, the S bit is 1. The S bit is 0 only if all the bits to the right of the R bit, including the truncated bits, are all 0's.

The FPA generator 250 generates the FPA bit to be used in determining the rounding bit. The FPA bit indicates if there is any round-up occurring in the generation of the temporary floating-point operand FTMP1. The FPA bit is determined by examining the operands FTMP2 and FTMP3 generated in recomputing the operation with the round-up and round-down control modes, respectively. The logic equation to generate the FPA bit is as follows:

FPA=!(Sign(FTMP1) AND (FTMP2<>FTMP3) and (FTMP1==FTMP3) OR (Sign(FTMP1) AND (FTMP2<>FTMP3) AND (FTMP1==FTMP2)

Where !, <>, and == denotes a complement operation, a not-equal relation and an equal relation, respectively.

The rounding bit generator 260 generates the rounding bit J according to the following equation:

$$J=((L \text{ AND } !FPA) \text{ OR } S \text{ OR } (P \text{ AND } !FPA)) \text{ AND } R$$

Where ! denotes a complement operation.

The adder 270 adds the rounding bit J to the significand part of the denormalized operand FTMP4 to generate the rounded result significand. The result register 280 stores the final result of the rounding. The final result operand is generated by merging the rounded result significand with the sign bit and the exponent part of the denormalized operand FTMP4.

Figure 3:
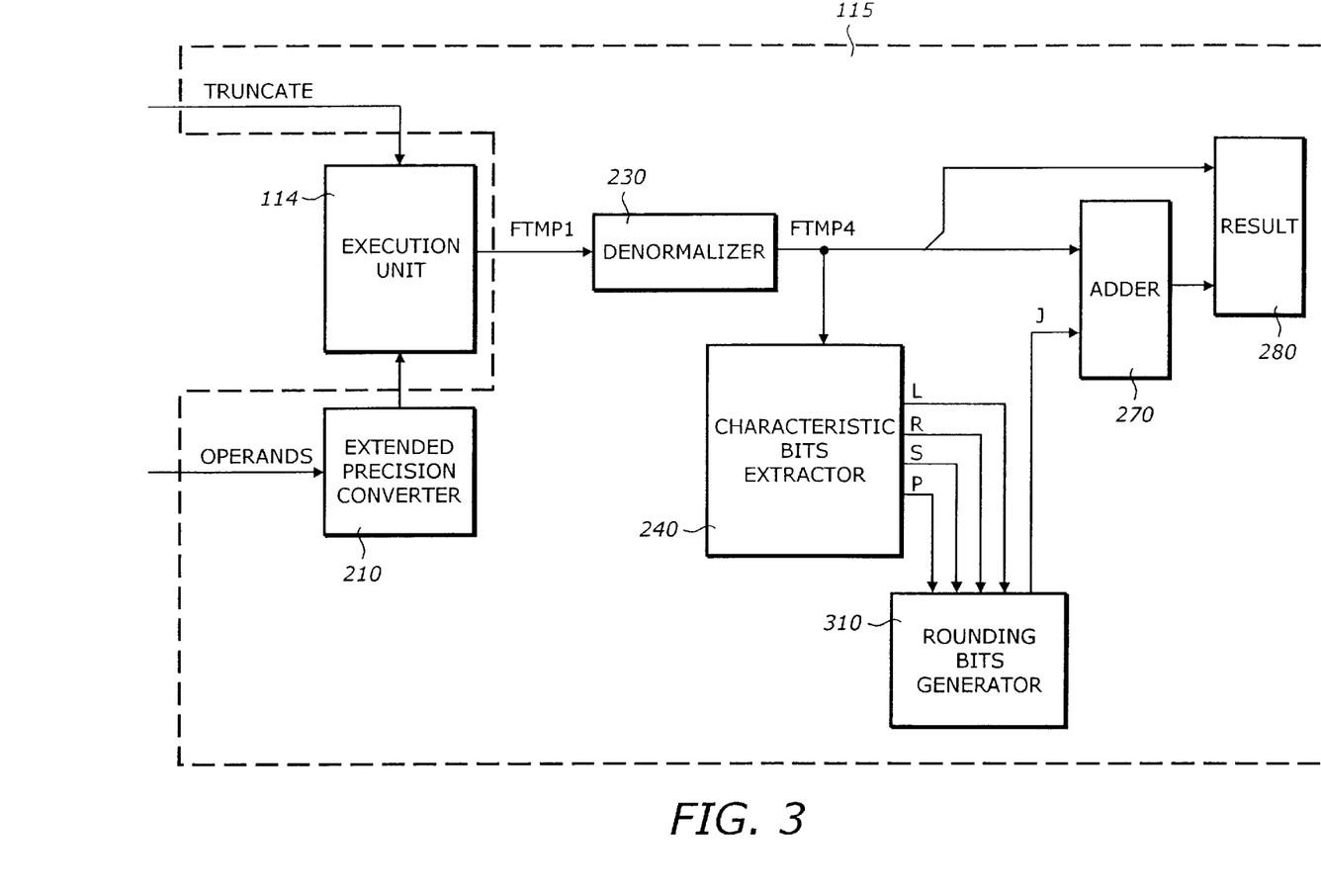
FIG. 3 is a diagram illustrating an optimal rounding generator according to one embodiment of the invention.

FIG. 3 is a diagram illustrating an optimal rounding generator according to one embodiment of the invention. The rounding generator 115 may be implemented by hardware, software, or by microcode. The rounding generator 115 includes the precision converter 210, the denormalizer 230, the characteristic bits extractor 240, a rounding bit generator 310, the adder 270, and the result register 280. The rounding generator 115 is coupled to the execution unit 114 in the rounding process. In one embodiment, the rounding generator 115 is implemented as a program or a microroutine in an underflow microcode handler responding to an underflow exception. When implemented in software or microcode, the elements of the rounding generator 115 as shown in FIG. 3 are essentially the code segments or steps in the rounding process. These code segments or steps may be performed in sequential, fully parallel, partially parallel, fully pipelined, partially pipelined, or mixed sequential, parallel, and pipelined mode depending on the microarchitecture of the processor. The program or microcode can be stored in a processor readable medium. The processor readable medium may include any medium that can store or transfer information. Examples of the processor readable medium includes an electronic circuit, a semiconductor memory device, a read-only memory (ROM), a flash memory, an erasable ROM (EROM), a floppy diskette, a compact disk (CD) ROM, an optical disk, a hard disk, a transmission medium, a fiber optic medium, a radio frequency (RF) link, etc.

The precision converter 210, the denormalizer 230, the characteristic bits extractor 240, the adder 270, and the result register 280 are essentially the same as in the standard rounding generator shown in FIG. 2. The main differences between the optimal rounding generator shown in FIG. 3 and the standard rounding generator shown in FIG. 2 include the following:

1. There is only one rounding mode in the recomputing the operands: the truncate rounding mode.

2. There is no FPA generator.

3. The generation of the rounding bit J is simpler because the term FPA is eliminated.

When recomputing the operands, only the truncate mode is used for rounding. Since truncate mode is used, it is guaranteed that round-up cannot occur in this recomputing step. Since round-up cannot occur, the FPA bit is guaranteed to be 0. Therefore, there is no need to generate the FPA bit and the equation for the rounding bit J is simplified.

The rounding bit generator 310 generates the rounding bit J according to the following equation:

$$J = (L \text{ OR } S \text{ OR } P) \text{ AND } R$$

If the optimal rounding generator is implemented in microcode, it requires less microcode in the underflow handler and is executed faster compared to the standard rounding generator. If the optimal rounding generator is implemented by hardware, it requires less hardware and also executes faster.

Figure 4:
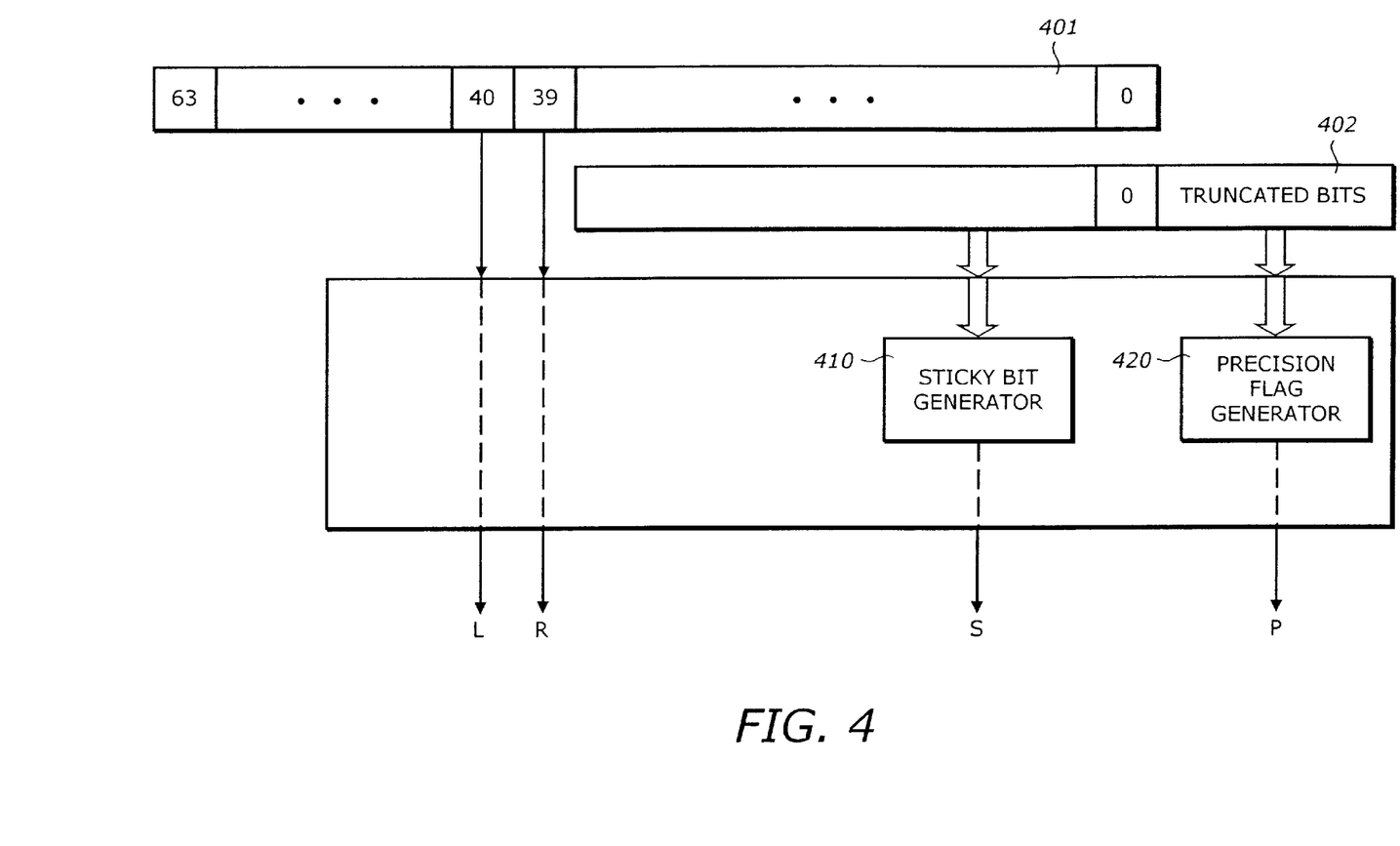
FIG. 4 is a diagram illustrating a characteristic bits extractor according to one embodiment of the invention.

FIG. 4 is a diagram illustrating a characteristic bits extractor according to one embodiment of the invention. The characteristic bits extractor 240 includes a sticky bit generator 410 and a precision flag generator 420. The characteristic bits extractor 240 receives a denormalized operand 401 from the denormalizer 230 in FIGS. 2 and 3 and an operand 402. In one embodiment, the denormalized operand 401 consists of 64 bits in which bits 40 to 63 represent the rounded significand part. The operand 402 includes bits 0 to 38 of the denormalized operand and the truncated bits.

The characteristic bits extractor 240 generates the L, R, S and P bits. The L bit is the least significant bit of the rounded denormalized operand. The R bit is the bit to the immediate right of the L bit. Using the 64-bit operand 402, the L and R bits correspond to bits 40 and 39, respectively.

The sticky bit generator 410 examines the operand 402 and generates a 1 if any bit in the operand 402 is 1 and a 0 if all bits in the operand 402 are 0's. The sticky bit generator 410 can be implemented as a OR gate. The precision flag generator 420 generates the P bit. The P bit is set to 1 if a non-zero bit was truncated before rounding; otherwise, it is reset to 0.

Figure 5:
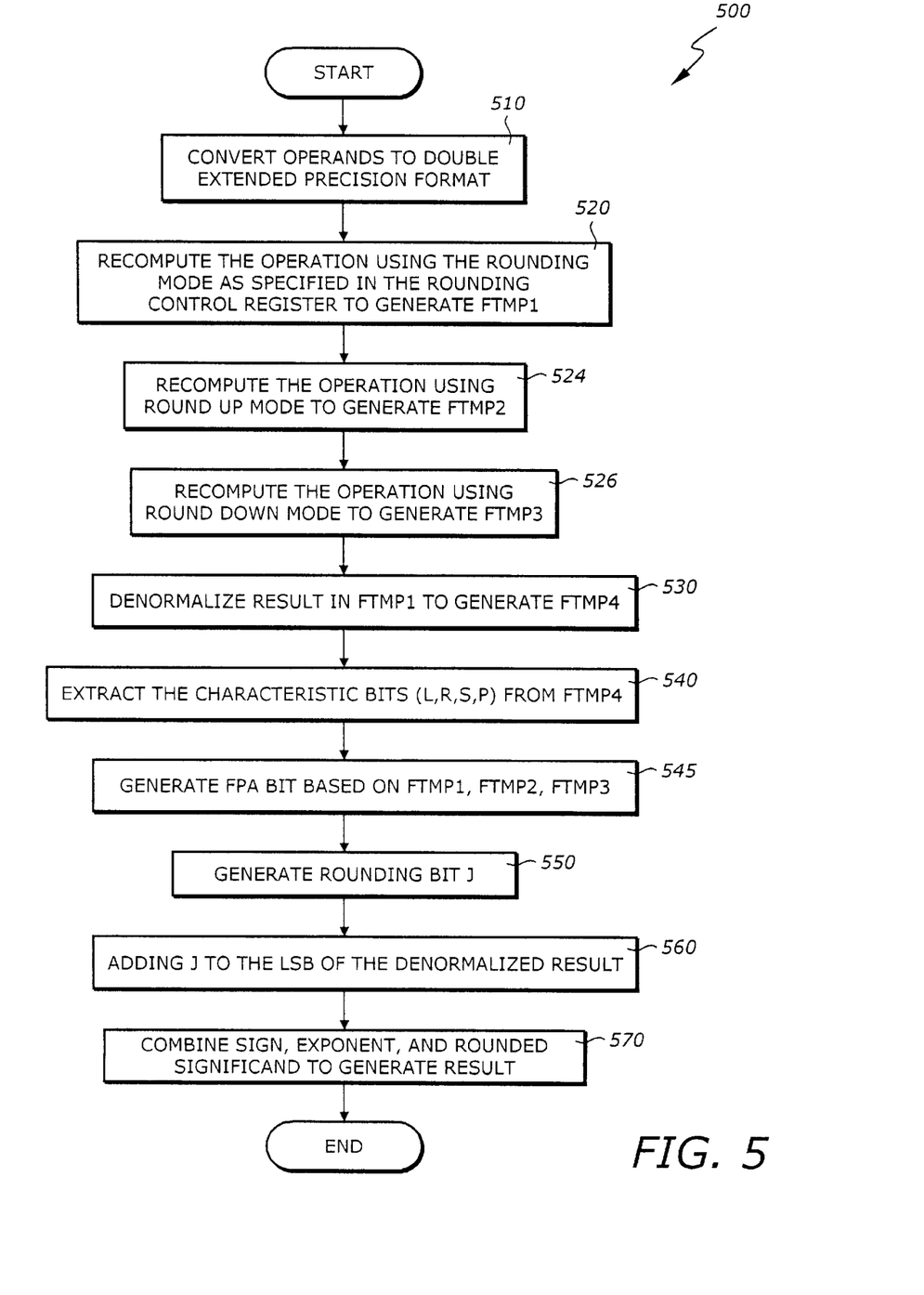
FIG. 5 is a flowchart illustrating a process to perform standard rounding according to one embodiment of the invention.

FIG. 5 is a flowchart illustrating a process 500 to perform standard rounding according to one embodiment of the invention.

Upon START, the process 500 converts the operands to double extended precision format (Block 510). In one embodiment, the double extended precision format has a 17-bit exponent and a 53-bit significand or mantissa.

The process 500 then recomputes the operation using the rounding mode as specified in the rounding control register to generate a temporary floating-point operand FTMP1 (Block 520). Next, the process 500 recomputes the operation using the round-up mode to generate FTMP2 (Block 524). Next, the process 500 recomputes the operation using the round-down mode to generate FTMP3 (Block 526).

The operand FTM1 is denormalized to generate the denormalized operand FTMP4 (Block 530). From the operand FTMP4, the characteristic bits (L, R, S, and P) are extracted (Block 540). The process 500 then generates the FPA bit based on the operands FTMP1, FTMP2, and FTMP3 (Block 545) using the equation (1). Next, the rounding bit J is generated using equation (2) (Block 550). The process 500 then adds the rounding bit J to the significand of the denormalized operand FTMP4 (Block 560). The final result is obtained by combining the sign bit, the exponent part, and the rounded significand part of the denormalized operand (Block 570). The process 500 is then terminated.

Figure 6:
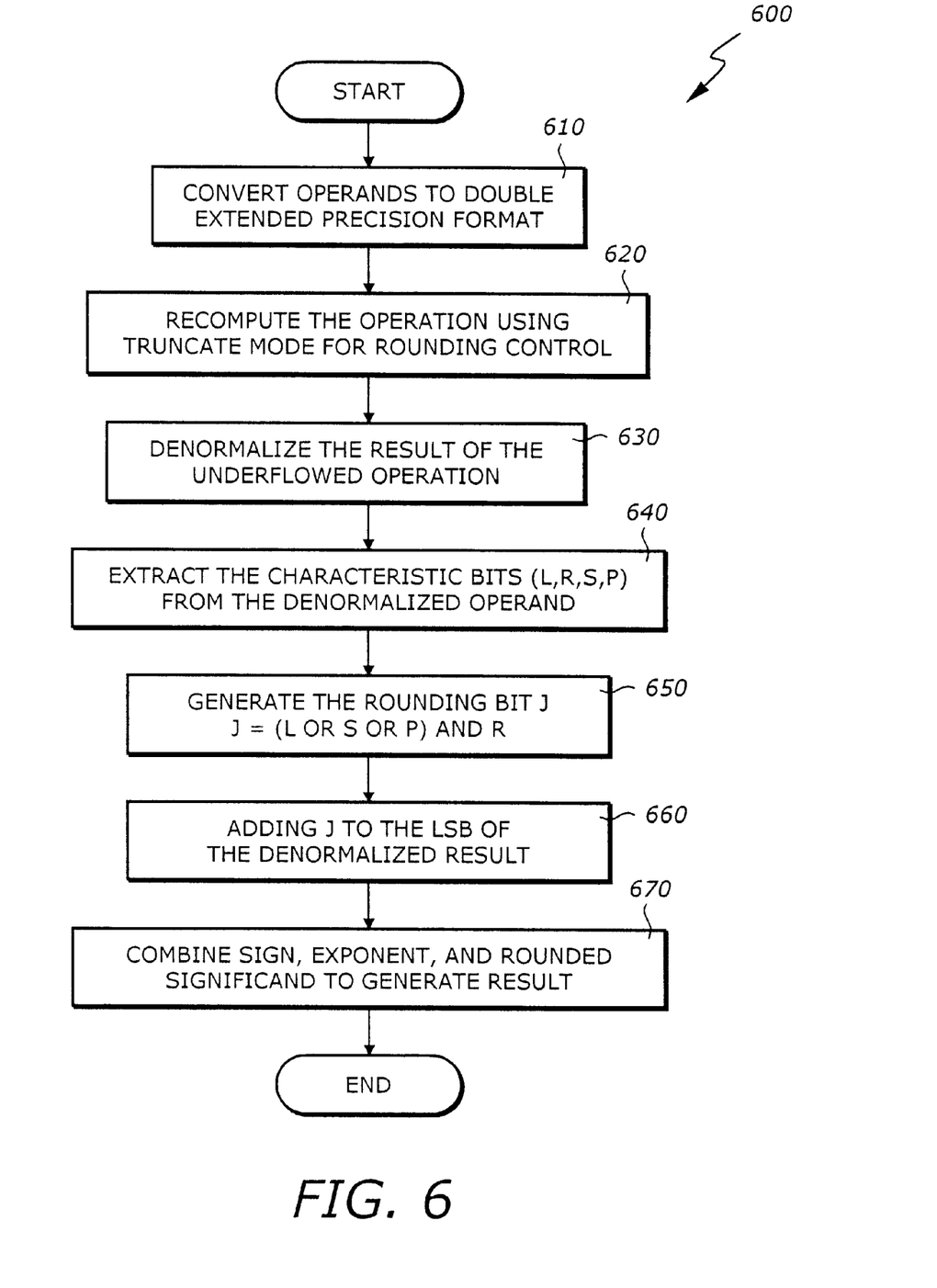
FIG. 6 is a flowchart illustrating a process to perform optimal rounding according to one embodiment of the invention.

FIG. 6 is a flowchart illustrating a process 600 to perform optimal rounding according to one embodiment of the invention.

Upon START, the process 600 converts the operands to double extended precision format (Block 610). In one embodiment, the double extended precision format has 17-bit exponent and 53-bit significand or mantissa.

The process 600 then recomputes the operation using the truncate mode (Block 620). Next, the operand is denormalized to generate the denormalized operand (Block 630). From the denormalized operand, the characteristic bits (L, R, S, and P) are extracted (Block 640). Next, the rounding bit J is generated using equation (3) (Block 650). The process 500 then adds the rounding bit J to the significand of the denormalized operand (Block 660). The final result is obtained by combining the sign bit, the exponent part, and the rounded significand part of the denormalized operand (Block 570). The process 500 is then terminated.

The present invention provides an efficient technique to perform optimal rounding for the floating-point computations that cause underflows. The technique eliminates the determination of the FPA bit which simplifies the generation of the rounding bit.

The present invention can be used in any applications that involve floating-point computations. Examples of these applications include three-dimensional (3-D) graphics, signal processing, image processing, matrix algebra, numerical methods, etc.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. A method comprising:
   (a) recomputing a floating point (FP) operation using a truncate rounding mode to generate an underflowed operand;
   (b) denormalizing the underflowed operand, the denormalized operand providing characteristic bits;
   (c) generating a rounding bit based on the characteristic bits; and
   (d) combining the rounding bit with the denormalized operand to generate a rounded result operand.

2. The method of claim 1 further comprising converting input operands to the FP operation in an extended precision format.

3. The method of claim 1 further comprising extracting the characteristic bits.

4. The method of claim 3 wherein the characteristic bits include a least significant bit (L) of a rounded significand of the denormalized operand, a right (R) bit, a sticky (S) bit, and a precision flag (P) bit.

5. The method of claim 4 wherein generating the rounding bit determines (L OR S OR P) AND R.

6. The method of claim 1 wherein combining comprises:
   adding the rounding bit to a least significant bit (LSB) of a significand part of the denormalized operand to generate a rounded significand part; and
   merging a sign bit and an exponent of the denormalized operand with the rounded significand to generate the rounded result operand.

7. An apparatus comprising:
   (a) a selector coupled to an execution unit for providing a truncate rounding mode in recomputing the FP operation to generate an underflowed operand;

(b) a denormalizer coupled to the execution unit to denormalize an underflowed operand, the denormalized operand providing characteristic bits;

(c) a rounding bit generator coupled to the denormalizer to generate a rounding bit based on the characteristic bits; and (d) a result combiner coupled to the denormalizer and the rounding bits generator to combine the rounding bit with the denormalized operand to generate a rounded result operand.

8. The apparatus of claim 7 further comprising (e) a converter to convert input operands to the FP operation in an extended precision format.

9. The apparatus of claim 7 further comprising a characteristic bit extractor coupled to the denormalizer to extract the characteristic bits.

10. The apparatus of claim 9 wherein the characteristic bits include a least significant bit (L) of a rounded significand of the denormalized operand, a right (R) bit, a sticky (S) bit, and a precision flag (P) bit.

11. The apparatus of claim 10 wherein the rounding bit generator determines (L OR S OR P) AND R.

12. The apparatus of claim 7 wherein the result combiner comprises:

an adder coupled to the denormalizer and the rounding bit generator for adding the rounding bit to a least significant bit (LSB) of a significand part of the denormalized operand to generate a rounded significand part; and a result register coupled to the adder and the denormalizer for storing the rounded result operand, the rounded result operand including a sign bit and an exponent of the denormalized operand with the rounded significand.

13. A processor readable medium having embodied thereon a program, the program comprising:

(a) a first code segment for recomputing a floating-point (FP) operation using a truncate rounding mode to generate an underflowed operand;

(b) a second code segment for denormalizing the underflowed operand, the denormalized operand providing characteristic bits;

(c) a third code segment for generating a rounding bit based on the characteristic bits; and (d) a fourth code segment for combining the rounding bit with the denormalized operand to generate a rounded result operand.

14. The processor readable medium of claim 13 further comprising a fifth code segment for converting input operands to the FP operation in an extended precision format.

15. The processor readable medium of claim 13 further comprising a sixth code segment for extracting the characteristic bits.

16. The processor readable medium of claim 15 wherein the characteristic bits include a least significant bit (L) of a rounded significand of the denormalized operand, a right (R) bit, a sticky (S) bit, and a precision flag (P) bit.

17. The processor readable medium of claim 16 wherein the third code segment determines (L OR S OR P) AND R.

18. The processor readable medium of claim 13 wherein the fourth code segment comprises:

a seventh code segment for adding the rounding bit to a least significant bit (LSB) of a significand part of the denormalized operand to generate a rounded significand part; and an eighth code segment for merging a sign bit and an exponent of the denormalized operand with the rounded significand to generate the rounded result operand.

19. A processor comprising:

an execution unit;

a processor readable medium having embodied thereon a program for processing by the processor for rounding a result operand of a floating-point (FP) operation, the FP operation causing an underflow, the program comprising:

(a) a first code segment for recomputing the FP operation using a truncate rounding mode to generate an underflowed operand;

(b) a second code segment for denormalizing the underflowed operand, the denormalized operand providing characteristic bits;

(c) a third code segment for generating a rounding bit based on the characteristic bits; and (d) a fourth code segment for combining the rounding bit with the denormalized operand to generate the rounded result operand.

20. The processor of claim 19 further comprising a fifth code segment for converting input operands to the FP operation in an extended precision format.

21. The processor of claim 19 further comprising a sixth code segment for extracting the characteristic bits.

22. The processor of claim 21 wherein the characteristic bits include a least significant bit (L) of a rounded significand of the denormalized operand, a right (R) bit, a sticky (S) bit, and a precision flag (P) bit.

23. The processor of claim 22 wherein the third code segment determines (L OR S OR P) AND R.

24. The processor of claim 19 wherein the fourth code segment comprises:

a seventh code segment for adding the rounding bit to a least significant bit (LSB) of a significand part of the denormalized operand to generate a rounded significand part; and an eighth code segment for merging a sign bit and an exponent of the denormalized operand with the rounded significand to generate the rounded result operand.

25. The apparatus of claim 9 wherein the characteristic bits extractor comprises:

a sticky bit generator to generate the sticky bit, and a precision flag generator to generate the precision flag bit.

* * * * *